United States Patent
Tseng et al.

(10) Patent No.: US 9,921,581 B2
(45) Date of Patent: Mar. 20, 2018

(54) AUTONOMOUS VEHICLE EMERGENCY OPERATING MODE

(71) Applicant: Ford Global Technologies, LLC, Dearborn, MI (US)

(72) Inventors: Fling Finn Tseng, Ann Arbor, MI (US); Imad Hassan Makki, Dearborn Heights, MI (US); Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/986,804

(22) Filed: Jan. 4, 2016

(65) Prior Publication Data

US 2017/0192429 A1 Jul. 6, 2017

(51) Int. Cl.
| | |
|---|---|
| *G05D 1/00* | (2006.01) |
| *G05D 1/02* | (2006.01) |
| *H04W 4/02* | (2018.01) |
| *G08G 1/00* | (2006.01) |
| *G08G 1/0965* | (2006.01) |
| *G08G 1/0967* | (2006.01) |
| *H04L 29/08* | (2006.01) |

(52) U.S. Cl.
CPC ......... *G05D 1/0088* (2013.01); *G05D 1/0214* (2013.01); *G05D 1/0223* (2013.01); *G05D 1/0287* (2013.01); *G08G 1/00* (2013.01); *G08G 1/0965* (2013.01); *G08G 1/096791* (2013.01); *H04W 4/02* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 5,825,304 A | 10/1998 | Marin | |
| 6,791,471 B2 | 9/2004 | Wehner et al. | |
| 7,515,065 B1 | 4/2009 | Bygrave et al. | |
| 8,676,427 B1* | 3/2014 | Ferguson | B60W 30/00 701/23 |
| 8,700,251 B1 | 4/2014 | Zhu et al. | |
| 8,838,321 B1 | 9/2014 | Ferguson | |
| 8,849,557 B1 | 9/2014 | Levandowski et al. | |
| 9,092,977 B1* | 7/2015 | Levandowski | G08G 1/01 |
| 9,278,689 B1* | 3/2016 | Delp | G08G 1/0965 |
| 9,478,137 B1* | 10/2016 | Nelson | G08G 1/161 |
| 9,718,471 B2* | 8/2017 | Gordon | B60W 30/16 |
| 2008/0161987 A1* | 7/2008 | Breed | G08G 1/161 701/27 |
| 2014/0278029 A1* | 9/2014 | Tonguz | G08G 1/087 701/117 |
| 2014/0358353 A1 | 12/2014 | Ibanez-Guzman et al. | |

(Continued)

*Primary Examiner* — Thomas G Black
*Assistant Examiner* — Demetra R Smith-Stewart
(74) *Attorney, Agent, or Firm* — Frank A. MacKenzie; Bejin Bieneman PLC

(57) ABSTRACT

A vehicle computing device has a data storage medium and a processing device programmed to execute instructions stored on the data storage medium. The instructions include detecting an emergency vehicle near an autonomous host vehicle, receiving operational data from nearby vehicles, and transmitting the operational data to the emergency vehicle. The operational data indicates whether one or more of the nearby vehicles is operating in an autonomous mode.

20 Claims, 4 Drawing Sheets

(56) References Cited

U.S. PATENT DOCUMENTS

| | | | |
|---|---|---|---|
| 2015/0161894 A1* | 6/2015 | Duncan | G08G 1/163 701/1 |
| 2015/0307131 A1* | 10/2015 | Froeschl | B62D 15/025 701/25 |
| 2016/0231746 A1* | 8/2016 | Hazelton | G05D 1/0212 |
| 2017/0030725 A1* | 2/2017 | Gordon | G01C 21/3415 |

* cited by examiner

AUTONOMOUS VEHICLE EMERGENCY OPERATING MODE

BACKGROUND

Autonomous vehicles handle some or all of the tasks associated with operating a vehicle. For instance, autonomous vehicles can operate the steering, acceleration, braking, etc., to navigate to a particular destination. Autonomous vehicles rely on sensors or other resources to detect nearby vehicles, pedestrians, and other objects. The autonomous vehicle is controlled according to the signals output by the sensors.

DETAILED DESCRIPTION

Figure 1:
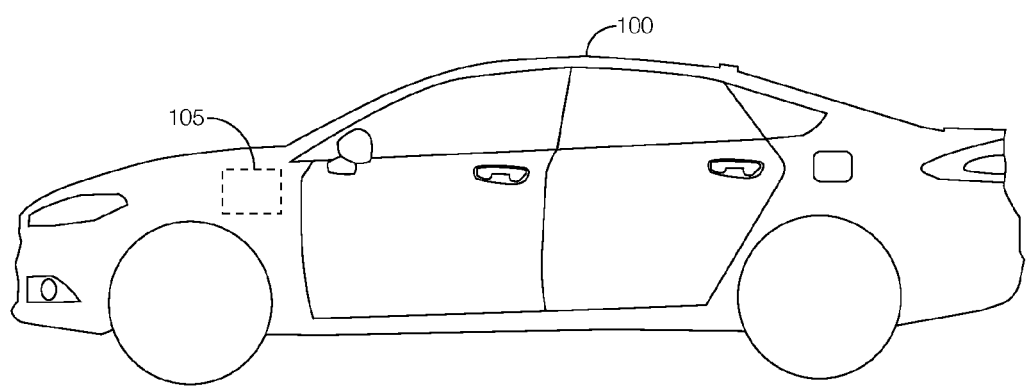
FIG. 1 illustrates an example autonomous vehicle with a system for receiving operational data from nearby vehicles and transmitting the operational data to an emergency vehicle.

Autonomous vehicles can be programmed to respond to the myriad of situations a human driver would face while manually operating a vehicle. One such situation relates to a nearby emergency vehicle, such as a police car, fire truck, or ambulance. Emergency vehicles can be operated in different capacities. For instance, when operating in an emergency capacity, the emergency vehicle will engage emergency lighting, sirens, or both. The lights and sirens communicate to a human driver that the emergency vehicle is operating in an emergency capacity and that the human driver must cede right of way to the emergency vehicle. In some instances, the emergency vehicle may even broadcast its route to nearby vehicles. When the lights and sirens are off, however, the emergency vehicle is treated as any other nearby vehicle. Autonomous vehicles can be programmed to respond appropriately to emergency vehicles based on whether the emergency vehicle is operating in an emergency or non-emergency capacity.

Likewise, drivers of emergency vehicles may expect other vehicles to behave a particular way when the emergency vehicle is operating in the emergency capacity. For instance, the driver of the emergency vehicle may expect nearby vehicles to slow down or stop to give the emergency vehicle the right of way. Vehicles equipped with vehicle-to-vehicle (V2V) communication technology can send messages to the emergency vehicle indicating that the emergency vehicle has been acknowledged and that the human driver or autonomous driver is taking an action to cede right of way to the emergency vehicle.

Simply acknowledging the emergency vehicle may not be enough, however. That is, it may be beneficial for the emergency vehicle to receive communications indicating which nearby vehicles are autonomously operated, which nearby vehicles are operated by human drivers, and if the autonomous vehicles are operating in their normal (non-emergency) modes or operating in an emergency mode that cedes right of way to the emergency vehicle. An autonomous host vehicle that is able to communicate such information to the emergency vehicle may include a computing device that has a data storage medium and a processing device programmed to execute instructions stored on the data storage medium. The instructions include detecting an emergency vehicle, which may include receiving information indicating that an emergency vehicle is approaching, near the autonomous host vehicle, receiving operational data from nearby vehicles, and transmitting the operational data to the emergency vehicle. The operational data indicates whether one or more of the nearby vehicles is operating in an autonomous mode, whether any nearby vehicles are operating in the emergency autonomous mode, the locations of one or more vehicles, etc.

Accordingly, the driver of the emergency vehicle will know which nearby vehicles are autonomous vehicles and which are human-driven. Further, as discussed in greater detail below, the communication to the emergency vehicle may indicate whether the autonomous vehicles have switched over to the emergency mode of operation or if they are continuing to follow their previous (non-emergency) route. Such information may be presented in the cabin of the emergency vehicle via a human-machine interface (HMI).

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the autonomous host vehicle 100 includes a detection system 105 for detecting and communicating with emergency vehicles. The detection system 105 may collect operational data from nearby vehicles. A nearby vehicle may include one or more vehicles in a wireless communication range of the detection system 105. The operational data may indicate whether one or more of the nearby vehicles is operating in an autonomous mode, a non-autonomous mode, or a partially autonomous mode. The operational data may further indicate whether any of the nearby vehicles has detected an emergency vehicle, and if so, if any of the nearby vehicles have altered their mode of operation accordingly. For instance, the operational data may indicate that one or more nearby vehicles has detected the emergency vehicle and is now operating in an emergency mode. While operating in the emergency mode, the nearby vehicle may cede right-of-way to the emergency vehicle by, e.g., pulling over to the side of the road, slowing down, allowing the emergency to proceed through an intersection even though the nearby vehicle would otherwise have right-of-way, etc.

The detection system 105 may independently detect the emergency vehicle, via, e.g., sensors that can recognize the emergency vehicle through the sirens or lights mounted to the emergency vehicle, through the operational data received from nearby vehicles, from an infrastructure device via a vehicle-to-infrastructure communication protocol, or from the emergency vehicle via a vehicle-to-vehicle communication protocol. When the emergency vehicle has been detected, the detection system 105 may establish communication with the emergency vehicle via a handshake process in accordance with a vehicle-to-vehicle communication protocol. The detection system 105 may transmit the operational data received from the nearby vehicles to the emergency vehicle so that, e.g., the driver of the emergency vehicle (or an autonomous mode controller incorporated into an autonomous emergency vehicle) will know which vehicles have detected the emergency vehicle, which vehicles are autonomously operated, and which vehicles have indicated that they have or will cede right-of-way to the emergency vehicle.

Moreover, the detection system 105 may further adjust how the autonomous host vehicle 100 operates after detecting a nearby emergency vehicle. For instance, the detection system 105 may control the host vehicle 100 according to an emergency autonomous mode. When operating in the emergency autonomous mode, the detection system 105 may limit certain movements of the host vehicle 100, such as preventing the host vehicle 100 from accelerating, decelerating, or both, preventing the host vehicle 100 from changing lanes, or taking any other action that gives the emergency vehicle the right-of-way.

In some instances, the detection system 105 may determine that no action is necessary even though an emergency vehicle has been detected nearby. For instance, the detection system 105 may receive a route from the emergency vehicle and predict the path of the emergency vehicle from its route. The detection system 105 may compare the route of the emergency vehicle to the route taken by the host vehicle 100 to determine where and when, if ever, the two overlap, intersect, or otherwise interfere. If the routes do not overlap or intersect, the detection system 105 may determine that the host vehicle 100 does not need to operate in the emergency autonomous mode and can continue with its route regardless of the presence of the emergency vehicle.

Additionally or in the alternative, even if the predefined routes overlap or intersect, the detection system 105 may predict when the host vehicle 100 will interfere with the emergency vehicle. That is, the detection system 105 may predict whether the host vehicle 100 will be at the overlapping or intersection locations of the route at or around the same time. If not, the detection system 105 may not command the host vehicle 100 to operate in the emergency autonomous mode. If so, however, the detection system 105 may operate the host vehicle 100 in the emergency autonomous mode in a way that gives up right-of-way to the emergency vehicle.

The detection system 105 may continue to operate the host vehicle 100 in the emergency autonomous vehicle until the host vehicle 100 is no longer expected to interfere with the predicted path of the emergency vehicle. The detection system 105 may permit or command the host vehicle 100 to operate in a non-emergency mode (i.e., resume normal autonomous operation) when the host vehicle 100 is not in the predicted path of the emergency vehicle even accounting for time considerations, as discussed below.

Although illustrated as a sedan, the host vehicle 100 may include any passenger or commercial automobile such as a car, a truck, a sport utility vehicle, a crossover vehicle, a van, a minivan, a taxi, a bus, etc. As discussed above, the host vehicle 100 may be an autonomous vehicle configured to operate in an autonomous (e.g., driverless) mode, a partially autonomous mode, and/or a non-autonomous mode. In some implementations, the detection system 105 may cause the host vehicle 100 to switch from operating in a non-autonomous mode to the emergency autonomous mode in response to detecting the emergency vehicle and may allow the host vehicle 100 to resume operating in a non-autonomous mode when the emergency vehicle is no longer nearby.

Figure 2:
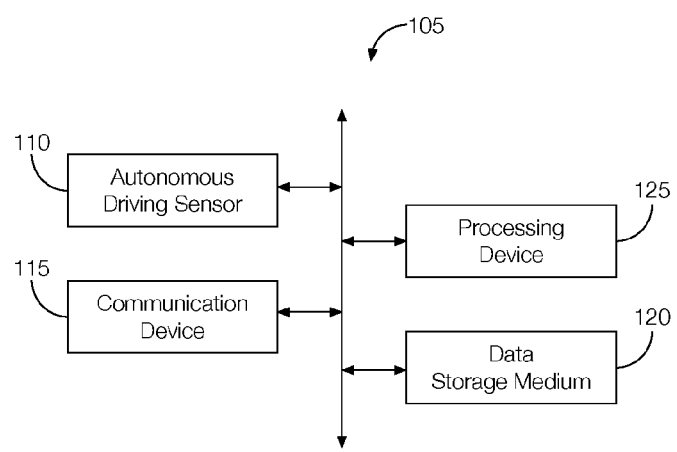
FIG. 2 illustrates example components of the system shown in FIG. 1.

Referring now to FIG. 2, the detection system 105 may include autonomous driving sensors 110, a communication device 115, a data storage medium 120, and a processing device 125.

The autonomous driving sensors 110 may include any number of electronic devices programmed to detect nearby vehicles, including a nearby emergency vehicle, while the host vehicle 100 is operating in an autonomous mode, a non-autonomous mode, or both. The autonomous driving sensors 110 may be further programmed to generate signals that can be used to navigate the host vehicle 100 while the vehicle is operating in the autonomous (e.g., driverless) mode. Examples of autonomous driving sensors 110 may include a radar sensor, a lidar sensor, a vision sensor, a microphone or other audio sensor, or the like. Accordingly, the autonomous driving sensors 110 help the host vehicle 100 "see" or "hear" the vehicle surroundings and/or navigate various obstacles while the vehicle is operating in the autonomous mode.

The communication device 115 may include any number of electronic devices programmed to facilitate wireless communication between the host vehicle 100 and nearby vehicles, between the host vehicle 100 and the emergency vehicle, or both. For instance, the communication device 115 may be programmed to receive operational data from nearby vehicles, transmit operational data and possibly other data to any emergency vehicles, and receive communications from nearby emergency vehicles. The communication device 115 may be programmed to communicate with the nearby vehicle, the host vehicle 100, or both, in accordance with a vehicle-to-vehicle communication protocol. An example of a vehicle-to-vehicle communication protocol may include, e.g., the dedicated short range communication (DSRC) protocol. Instead of directly communicating with nearby vehicles, the communication device 115 may be programmed to communicate with infrastructure devices in accordance with a vehicle-to-infrastructure communication protocol. The DSRC protocol may also be implemented to facilitate the vehicle-to-infrastructure communication.

The data storage medium 120 may include any number of electronic memory storage devices that can store computer-executable code. The data storage medium 120 may make the computer-executable code available to, e.g., the processing device 125. The computer-executable code may include instructions for performing the various operations of the processing device 125, the communication device 115, the autonomous driving sensors 110, or the like.

The processing device 125 may include any number of electronic devices programmed to execute instructions stored in the data storage medium 120. In accordance with such instructions, the processing device 125 may be programmed to process signals received from the autonomous driving sensors 110 and control the host vehicle 100 accordingly, especially when the host vehicle 100 is operating in an autonomous or partially autonomous mode. Further, the processing device 125 may be programmed to operate the host vehicle 100 in particular ways based on the presence of a nearby emergency vehicle. For instance, in response to detecting a nearby emergency vehicle, the processing device 125 may be programmed to command the communication device 115 to transmit any received operational data to the emergency vehicle. The emergency vehicle may be detected based on signals output by the autonomous driving sensors 110, operational data received from nearby vehicles (e.g., a nearby vehicle detected the emergency vehicle and communicated as much to the host vehicle 100)

Moreover, the processing device 125 may be programmed to operate the host vehicle 100 in the emergency autonomous mode. That is, the processing device 125 may serve as an autonomous mode controller any time the host vehicle 100 is operating in an autonomous or partially autonomous mode, including the emergency autonomous mode. While serving as an autonomous mode controller, the processing device 125 may be programmed to control one or more subsystems. Examples of subsystems that may be controlled by the processing device 125 may include a brake subsystem, a suspension subsystem, a steering subsystem, and a powertrain subsystem. The processing device 125 may control any one or more of these subsystems by outputting signals to control units associated with these subsystems. The processing device 125 may control the subsystems based, at least in part, on signals generated by the autonomous driving sensors 110.

When operating the host vehicle 100 in the emergency autonomous mode, the processing device 125 may be programmed to prevent the host vehicle 100 from accelerating, decelerating, executing a lane change, etc. That is, the processing device 125 may set an acceleration level, a deceleration level, a steering command level, etc., to a predetermined value such as zero (0). When the respective values are set to the predetermined value, the host vehicle 100 may be prevented from accelerating, decelerating, or changing lanes. Further, the processing device 125 may be programmed to determine whether the host vehicle 100, while operating in the autonomous mode, interferes with a path of the emergency vehicle. That is, the processing device 125 may receive signals output by a navigation system identifying a route of the autonomous host vehicle 100 (the "host route"). The processing device 125 may compare the host route to the actual or a predicted route of the emergency vehicle (the "emergency route"), which may be received from the emergency vehicle via vehicle-to-vehicle communications received via, e.g., the communication device 115 or predicted by the processing device 125 based on a present trajectory of the emergency vehicle.

The processing device 125 may be programmed to compare the emergency route to the host route and determine where and when, if ever, the two routes overlap, intersect, or otherwise interfere. If the routes do not overlap or intersect, the processing device 125 may determine that the host vehicle 100 does not need to operate in the emergency autonomous mode and can continue with its route regardless of the presence of the emergency vehicle. In this instance, therefore, the processing device 125 may be programmed to continue to operate the host vehicle 100 in whatever mode it was operating in before the emergency vehicle was detected instead of switching to the emergency autonomous mode.

Additionally or in the alternative, even if the routes overlap or intersect, the processing device 125 may predict when the host vehicle 100 will interfere with the emergency vehicle to determine whether the host vehicle 100 will be at the overlapping or intersection locations of the routes at or around the same time. If not, the processing device 125 may continue to operate the host vehicle 100 according to the mode it was operating in before the emergency vehicle was detected. If the host vehicle 100 is expected to interfere with the emergency vehicle, however, the processing device 125 may be programmed to operate the host vehicle 100 in the emergency autonomous mode in a way that cedes right-of-way to the emergency vehicle.

In one possible approach, the processing device 125 may be programmed to determine whether the host vehicle 100 will interfere with the emergency vehicle according to various tolerances. For instance, the host vehicle 100 may "interfere" with the emergency vehicle if the host route will take the host vehicle 100 within 500 or 1000 feet of the emergency vehicle.

The processing device 125 may be programmed to continue to operate the host vehicle 100 in the emergency autonomous vehicle until the host vehicle 100 no longer interferes with, or is no longer expected to interfere with, the predicted path of the emergency vehicle. The processing device 125 may be programmed to permit or command the host vehicle 100 to operate in a non-emergency mode (i.e., resume normal autonomous operation) when the host vehicle 100 is not in the predicted or actual path of the emergency vehicle.

Figure 3:
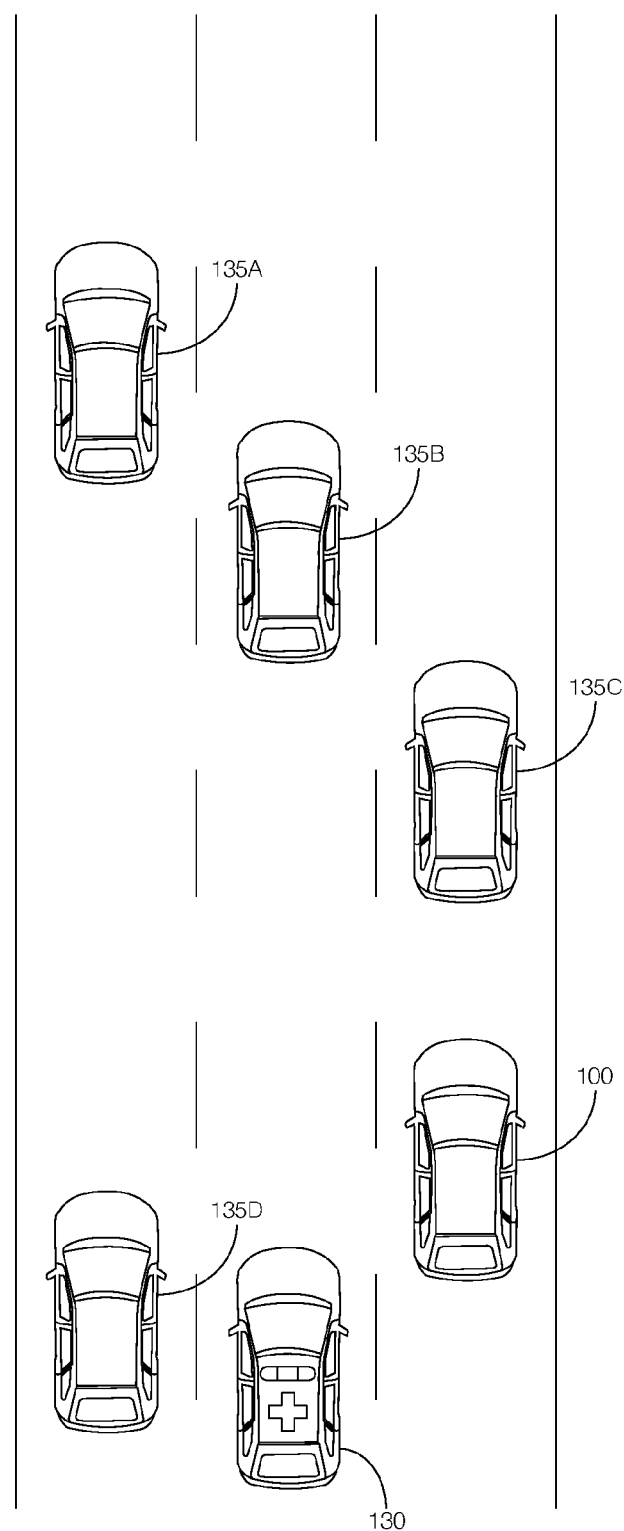
FIG. 3 illustrates an emergency vehicle approaching a group of vehicles, including the example autonomous vehicle of FIG. 1 and other nearby vehicles.

FIG. 3 illustrates an example scenario where an emergency vehicle 130 is approaching a group of vehicles 135, at least one of which (identified as the host vehicle 100) is equipped with the detection system 105 described above. Prior to detecting the emergency vehicle 130, the host vehicle 100 may exchange operational data with one or more of the nearby vehicles 135. The vehicle 135A, the vehicle 135B, the vehicle 135D, and the host vehicle 100 may be operating in an autonomous mode. The vehicle 135C may be a human-operated vehicle or an autonomous vehicle operating in a non-autonomous mode. The host vehicle 100 may receive and transmit the operational data associated with its own operation, as well as the operation of the vehicles 135, to the emergency vehicle 130. If the vehicle 135C is a non-autonomous vehicle or is otherwise incapable of vehicle-to-vehicle communications, the host vehicle 100 may not receive operational data from the vehicle 135C. In this case, the host vehicle 100 may communicate as much to the emergency vehicle 130.

In addition to communicating, via the operational data, whether the nearby vehicles 135 A-D are autonomous operated, the host vehicle 100 may further communicate whether each vehicle 135A-D is aware of the emergency vehicle 130 and taking an appropriate action. For instance, the operational data transmitted from the host vehicle 100 to the emergency vehicle 130 may indicate that the host vehicle 100, vehicle 135A, and vehicle 135B are aware of the emergency vehicle 130 and operating in an emergency autonomous mode. As discussed above, the emergency autonomous mode may include limiting certain maneuvers such as acceleration, deceleration, lane changes, etc. The operational data transmitted to the emergency vehicle 130 may further indicate that vehicle 135D is an autonomous vehicle, has acknowledged the presence of the emergency vehicle 130, but will not be changing its autonomous driving mode since the path of the vehicle 135D is not expected to interfere with the predicted path of the emergency vehicle 130. Finally, the operational data transmitted from the host vehicle 100 to the emergency vehicle 130 may indicate that the vehicle 135C is a human-operated vehicle, which may indicate to the driver of the emergency vehicle 130 that the driver of vehicle 135C may or may not be aware of the presence of the emergency vehicle 130.

Since vehicle 135B is in the path of the emergency vehicle 130 (the same lane), operating vehicle 135B in the emergency autonomous mode may include causing vehicle 135B to move to a different lane. In some instances, changing lanes may require vehicle 135B to accelerate or decelerate even though such actions may not typically be permitted for other vehicles not in the path of the emergency vehicle 130, such as vehicle 135A and D, while operating in the emergency autonomous mode. Alternatively, vehicle 135B may predict the path of the emergency vehicle 130 and compare the predicted path relative to its own path. Vehicle 135B may not enter the emergency autonomous mode if, e.g., the path of vehicle 135B will have vehicle 135B change lanes and exit the current road before the emergency vehicle 130 is predicted to overtake vehicle 135B.

Figure 4:
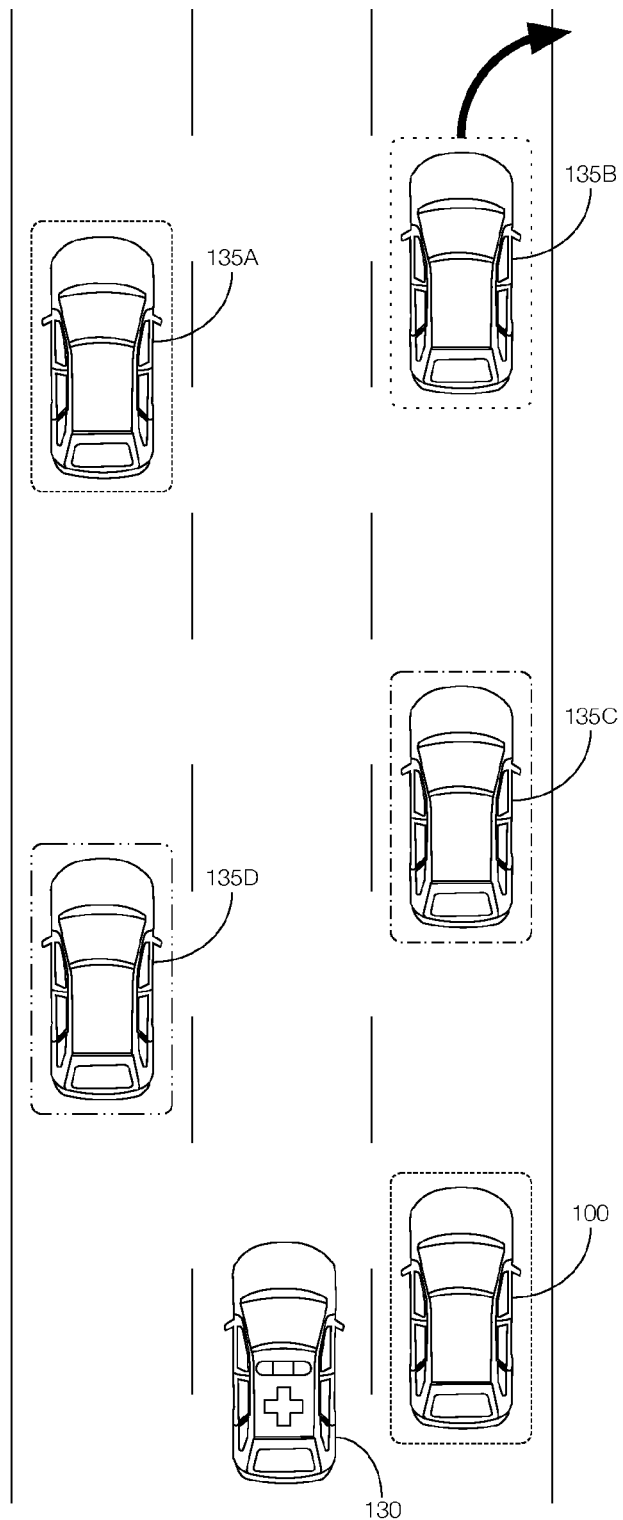
FIG. 4 illustrates a graphical representation of how the operational data may be presented in the emergency vehicle.

FIG. 4 is a graphical representation of how the operational data may be presented to a driver of the emergency vehicle 130. An image of the nearby vehicles, such as vehicle 135A-D, the host vehicle 100, and the emergency vehicle 130, may be presented on a display screen inside the emergency vehicle 130. Each image may indicate whether the vehicle 135A-D is an autonomous vehicle operating in an autonomous or partially autonomous mode, an autonomous vehicle operating in a non-autonomous mode, an autonomous vehicle operating in the emergency autonomous mode (which may mean that the autonomous vehicle has already detected the emergency vehicle 130), or a human-powered vehicle.

The vehicle 135A and the host vehicle 100 may be presented as autonomous vehicles operating in an emergency autonomous mode. The images for vehicle 135B and vehicle 135D may represent that those are autonomous vehicles operating in a non-emergency autonomous mode. The image for vehicle 135D may further indicate whether vehicle 135D has detected the emergency vehicle 130 and does not expect to interfere with the emergency vehicle 130 to distinguish instances where the vehicle 135D simply has not yet detected the presence of the emergency vehicle 130. The image for vehicle 135B may indicate that it has detected the emergency vehicle 130 but will not interfere with the emergency vehicle 130 (e.g., vehicle 135B will turn off the road before the emergency vehicle 130 overtakes vehicle 135B). Therefore, the image for vehicle 135B may indicate that vehicle 135B is continuing to operate in a non-emergency autonomous mode. Finally, the vehicle 135C may be presented as a non-autonomous vehicle or an autonomous vehicle that is operating in a non-autonomous mode.

The graphical representations may be presented on a display screen inside the passenger compartment of the emergency vehicle 130. In some instances, the different images used for the different types of vehicle situations, discussed above, may be associated with different colors, icons, or other visually distinguishing characteristics. For instance, if vehicle 135B has communicated that it will exit the road before the emergency vehicle 130 overtakes it, the image for vehicle 135B may reflect as much. Therefore, the driver of the emergency vehicle 130 can glance at the display screen and have a general idea of which nearby vehicles 135 have ceded right-of-way, which have detected the presence of the emergency vehicle 130, and which will have an unknown status because, e.g., the vehicle is unable to wirelessly communicate its operating mode.

Further, the graphical representation may be presented on a virtual map that generally places the image associated with each nearby vehicle 135 in an approximate position relative to the emergency vehicle 130. The position of each nearby vehicle 135 may be determined from the operational data transmitted from the host vehicle 100 and may be updated in real time as the emergency vehicle 130, the host vehicle 100, or the nearby vehicles 135 move.

Figure 5:
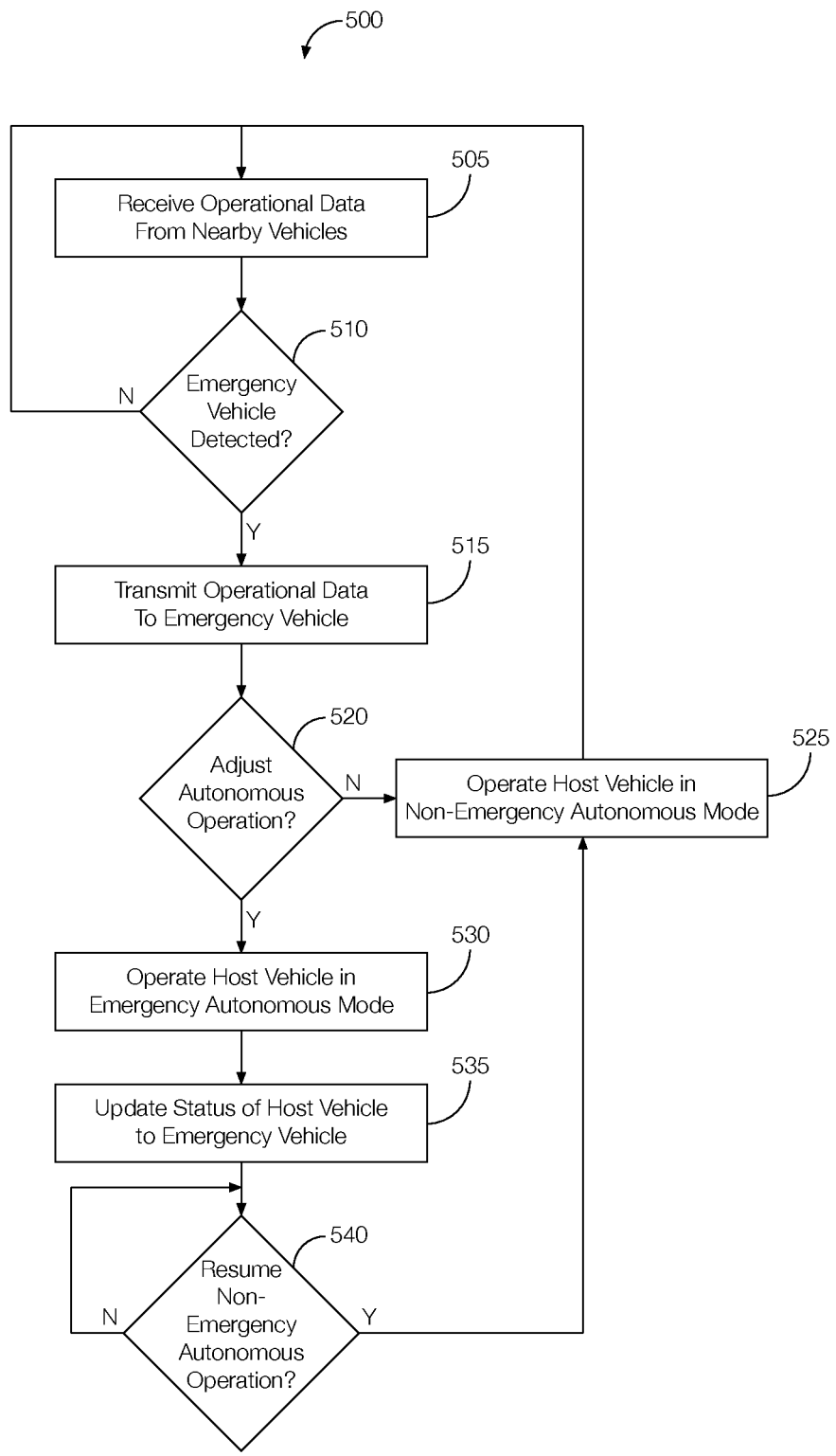
FIG. 5 is a flowchart of an example process that may be executed by the vehicle system shown in FIG. 1.

FIG. 5 is a flowchart of an example process 500 that may be executed by the detection system 105. The process 500 may begin after the host vehicle 100 is started and begins operating in an autonomous or at least partially autonomous mode. The process 500 may continue to execute until the host vehicle 100 is turned off or is no longer operating in an autonomous or partially autonomous mode.

At block 505, the detection system 105 may receive operational data form nearby vehicles. The operational data may be received by the detection system 105 via the communication device 115 and processed by the processing device 125. The operational data may indicate whether one or more of the nearby vehicles is operating in an autonomous mode, a non-autonomous mode, or a partially autonomous mode. The operational data may further indicate whether any of the nearby vehicles has detected an emergency vehicle, and if so, if any of the nearby vehicles have altered their mode of operation accordingly. The operational data may be received in accordance with a vehicle-to-vehicle communication protocol, a vehicle-to-infrastructure communication protocol, or the like. An example communication protocol may include the dedicated short range communication (DSRC) protocol.

At decision block 510, the detection system 105 may determine whether an emergency vehicle is detected near the host vehicle 100. The emergency vehicle may be detected by the autonomous driving sensors 110 that can recognize the emergency vehicle from its shape or the sirens or lights mounted to the emergency vehicle. In addition or in the alternative, the detection system 105 may detect the emergency vehicle from the operational data received at block 505. If an emergency vehicle is detected, the process 500 may proceed to block 515. If no emergency vehicles have been detected, the process 500 may return to block 505.

At block 515, the detection system 105 may transmit the operational data received at block 505 to the emergency vehicle. The communication device 115 may be commanded, by the processing device 125, to transmit the operational data to the emergency vehicle in accordance with a vehicle-to-vehicle communication protocol, a vehicle-to-infrastructure communication protocol, or the like. In addition to the operational data received at block 505, the communication device 115 may be further commanded to transmit operational data relative to a status of the host vehicle 100 (i.e., whether the host vehicle 100 is operating in an autonomous mode) by the processing device 125. By transmitting the operational data to the emergency vehicle, the driver of the emergency vehicle may be able to determine which nearby vehicles are autonomously or non-autonomously operated, which have recognized the emergency vehicle, and which are operating in an emergency autonomous mode.

At decision block 520, the detection system 105 may determine whether to adjust its own autonomous mode operation. For instance, the processing device 125 may determine whether any action is necessary based on the presence of the emergency vehicle. In one possible implementation, the processing device 125 may receive a route from the emergency vehicle and predict the path of the emergency vehicle from its route. The processing device 125 may further compare the route of the emergency vehicle to the route taken by the host vehicle 100 to determine where and when, if ever, the two overlap, intersect, or otherwise interfere. If the routes do not overlap or intersect in both time and space, the processing device 125 may determine that the host vehicle 100 does not need to adjust its mode of operation (i.e., the host vehicle 100 does not need to operate in the emergency autonomous mode) and can continue with its route regardless of the presence of the emergency vehicle. In this case, the process 500 may proceed to block 525. If the routes do overlap in both time and space, the processing device 125 may determine that the operating mode of the host vehicle 100 should be adjusted, in which case the process 500 may proceed to block 530.

At block 525, the detection system 105 may continue to operate the host vehicle 100 in the non-emergency autonomous mode. That is, the processing device 125 may command various vehicle subsystems to continue upon the same path that the host vehicle 100 was on prior to detecting the emergency vehicle. This may include permitting the host vehicle 100 to accelerate, decelerate, and change lanes as if the emergency vehicle were not detected at block 510. The process 500 may proceed to block 505 so that more operational data may be collected and the presence of the emergency vehicle, or a different emergency vehicle, evaluated.

At block 530, the detection system 105 may operate the host vehicle 100 in an emergency autonomous mode. When operating in the emergency autonomous mode, the processing device 125 may output command signals that operate various vehicle subsystems in a way that cedes right-of-way to the emergency vehicle. The command signals output by the processing device 125 may prevent the host vehicle 100 from accelerating, decelerating, changing lanes, etc., unless doing so will not interfere with the projected path of the emergency vehicle. Further, while operating in the emergency autonomous mode, the processing device 125 may command the host vehicle 100 to change lanes to move out of the lane of the emergency vehicle, which may include commanding the host vehicle 100 to pull over to a shoulder of the road.

At block 535, the detection system 105 may transmit updated operational data to the emergency vehicle. The updated operational data may include an updated status of the host vehicle 100. That is, the processing device 125 may command the communication device 115 to transmit a message to the emergency vehicle indicating that the host vehicle 100 is now operating in the emergency autonomous mode.

At decision block 540, the detection system 105 may determine whether the host vehicle 100 can resume non-emergency autonomous operation. For instance, the processing device 125, based on signals received via the autonomous driving sensors 110, the communication device 115, or both, may determine whether the host vehicle 100 is still in the path of or may otherwise interfere with the route of the emergency vehicle. If so, the processing device 125 may determine that the host vehicle 100 cannot resume non-emergency autonomous operation, and the process 500 may continue to execute block 540 so that the effect of the emergency vehicle on the host vehicle 100 can be continually reevaluated. If the emergency vehicle is no longer near the host vehicle 100, or if the host vehicle 100 is no longer expected to interfere with the emergency vehicle, the process 500 may proceed to block 525 so that the host vehicle 100 may resume operating in the non-emergency autonomous mode.

Accordingly, with the detection system 105 incorporated into the host vehicle 100, the driver of the emergency vehicle will know which nearby vehicles are autonomous vehicles and which are human-driven. Further, the communication to the emergency vehicle may indicate whether the nearby autonomous vehicles, including the host vehicle 100, have switched over to the emergency mode of operation or if they are continuing to follow their previous (non-emergency) route. With this knowledge, the driver or autonomous controller of the emergency vehicle can make decisions about how best to navigate through traffic.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle computing device comprising a data storage medium and a processing device programmed to execute instructions stored on the data storage medium, the instructions including:
   detecting an emergency vehicle near a host vehicle, wherein the host vehicle is an autonomous vehicle;
   receiving operational data from nearby vehicles, the operational data indicating whether one or more of the nearby vehicles is operating in an autonomous mode; and
   transmitting the operational data to the emergency vehicle.

2. The vehicle computing device of claim 1, the instructions further including operating the host vehicle in an emergency autonomous mode as a result of detecting the emergency vehicle.

3. The vehicle computing device of claim 2, wherein operating the host vehicle in the emergency autonomous mode includes preventing the host vehicle from accelerating or decelerating.

4. The vehicle computing device of claim 2, wherein operating the host vehicle in the emergency autonomous mode includes preventing the host vehicle from changing lanes.

5. The vehicle computing device of claim 1, the instructions further including determining whether operating the host vehicle in the autonomous mode interferes with a path of the emergency vehicle.

6. The vehicle computing device of claim 5, wherein determining whether operating the host vehicle in the autonomous mode interferes with the path of the emergency vehicle includes determining the path of the emergency vehicle.

7. The vehicle computing device of claim 6, wherein determining whether operating the host vehicle in the autonomous mode interferes with the path of the emergency vehicle includes determining whether the host vehicle is in the path of the emergency vehicle.

8. The vehicle computing device of claim 7, the instructions further including continuing to operate the host vehicle in the emergency autonomous mode if the host vehicle is in the path of the emergency vehicle.

9. The vehicle computing device of claim 8, the instructions further including operating the host vehicle in a non-emergency autonomous mode if the host vehicle is not in the path of the emergency vehicle.

10. The vehicle computing device of claim 1, wherein receiving the operational data from nearby vehicles includes receiving the operational data according to a vehicle-to-vehicle communication protocol.

11. The vehicle computing device of claim 1, wherein transmitting the operational data to the emergency vehicle includes transmitting the operational data according to a vehicle-to-vehicle communication protocol.

12. A vehicle system comprising:
   an autonomous driving sensor programmed to detect nearby vehicles and an emergency vehicle while a host vehicle is operating in an autonomous mode;
   a communication device programmed to wirelessly communicate with the nearby vehicles and the emergency vehicle, wherein the communication device is programmed to receive operational data from at least one of the nearby vehicles and transmit the operational data to the emergency vehicle, the operational data indicating whether at least one of the nearby vehicles is operating in an autonomous mode; and a processing device programmed to command the communication device to transmit the operational data as a result of the autonomous driving sensor detecting the emergency vehicle.

13. The vehicle system of claim 12, wherein the processing device is programmed to operate the host vehicle in an emergency autonomous mode as a result of detecting the emergency vehicle.

14. The vehicle system of claim 13, wherein the processing device is programmed to prevent the host vehicle from accelerating or decelerating while the host vehicle is operating in the emergency autonomous mode.

15. The vehicle system of claim 13, wherein the processing device is programmed to prevent the host vehicle from changing lanes while the host vehicle is operating in the emergency autonomous mode.

16. The vehicle system of claim 12, wherein the processing device is programmed to determine whether operating the host vehicle in the autonomous mode interferes with a path of the emergency vehicle.

17. The vehicle system of claim 16, wherein determining whether operating the host vehicle in the autonomous mode interferes with the path of the emergency vehicle includes determining the path of the emergency vehicle and determining whether the host vehicle is in the path of the emergency vehicle.

18. The vehicle system of claim 17, wherein the processing device is programmed to continue to operate the host vehicle in the emergency autonomous mode if the host vehicle is in the path of the emergency vehicle and operate the host vehicle in a non-emergency autonomous mode if the host vehicle is not in the path of the emergency vehicle.

19. The vehicle system of claim 12, wherein the communication device is programmed to receive the operational data from nearby vehicles according to a vehicle-to-vehicle communication protocol.

20. The vehicle system of claim 12, wherein the communication device is programmed to transmit the operational data to the emergency vehicle according to a vehicle-to-vehicle communication protocol.

* * * * *